United States Patent [19]

Desmarais et al.

[11] Patent Number: 5,467,190
[45] Date of Patent: Nov. 14, 1995

[54] DIGITAL TO ANALOG INTERFACE CONVERSION CIRCUIT

[75] Inventors: Richard R. Desmarais; Andrew J. Karpinski, Jr., both of Clearwater, Fla.

[73] Assignee: Honeywell Inc., Minneapolis, Minn.

[21] Appl. No.: 93,054

[22] Filed: Jul. 16, 1993

[51] Int. Cl.⁶ .......................... G01C 19/64; G01C 19/66
[52] U.S. Cl. .......................................................... 356/350
[58] Field of Search ............................................. 356/350

[56] References Cited

U.S. PATENT DOCUMENTS 4,280,766  7/1981  Goss et al. .................................. 356/350

*Primary Examiner*—Vincent P. McGraw
*Attorney, Agent, or Firm*—Thomas A. Rendos

[57] ABSTRACT

An interface circuit is provided to allow substitution of digital output rotation sensors such as fiber optic gyroscopes or ring laser gyroscopes in place of spinning mass gyroscopes. The pulses generated from the fiber optic gyroscope, or from a ring laser gyroscope are converted to a voltage representative of volts per degrees per second and are summed with an inverted volts per degrees per second at an integrating summing amplifier to result in an error signal in volts per degrees per second when there is a difference between the actual output of the gyroscope and the command signal.

8 Claims, 3 Drawing Sheets

DIGITAL TO ANALOG INTERFACE CONVERSION CIRCUIT

FIELD OF THE INVENTION

This invention relates to an interface circuit which permits substitution of digital output rotation sensors in place of spinning mass analog rotation output sensors in existing analog output sensor configured systems. More specifically, the invention relates to an interface circuit which permits substitution of fiber optic gyroscopes or ring laser gyroscopes in place of spinning mass gyroscopes.

BACKGROUND OF THE INVENTION

A number of aircraft, satellites or other vehicles presently in use rely on spinning mass gyroscopes having an analog output for use in guidance of the vehicle. Typically, such gyroscopes are connected to onboard electronics and provide an analog output which is processed to provide guidance information to the operator or a computerized control system of the vehicle, for example, a pilot or an onboard computer.

With the advent of fiber optic gyroscopes and ring laser gyroscopes, these types of devices have increasingly replaced spinning mass gyroscope systems because of their accuracy and reduced size and weight. Thus, modern day aircraft are constructed with such fiber optic gyroscopes and ring laser gyroscopes, and with appropriate electronics configured for operation with the fiber optic gyroscopes or ring laser gyroscopes. When employed, the output of these newer types of devices is digital in nature and the electronics employed is adapted for processing the digital output for use in vehicle navigation.

Although such modern vehicles are increasingly constructed with the fiber optic gyroscope systems or ring laser gyroscope as a component thereof, it also has become desirable to replace the spinning mass gyroscope systems of older vehicles with the more modern and lighter fiber optic gyroscopes or ring laser gyroscopes. A problem with such replacement, however, is that the electronics on the older vehicles are configured for operating with the spinning mass system and it has been thought that to implement such fiber optic gyroscopes or ring laser gyroscopes in older vehicles, the entire electronics must be converted to the type presently in use with the newer types of devices. This can be costly and cumbersome.

In accordance with the invention, retro-fitting of the entire electronics of older systems is avoided while permitting replacement of the older spinning mass-type gyroscopes with the more modern fiber optic gyroscope or ring laser gyroscope systems.

SUMMARY OF THE INVENTION

In accordance with the invention there is provided an interface circuit for use in connecting a rotation sensor and its associated electronics having a digital pulse output to a rotation measuring system for use with a spinning mass rotation sensor. For purposes of this disclosure, the term "associated electronics" means conventional electronics used to provide loop closure for the rotation sensor and condition the sensor outputs to provide digital pulsed outputs where the pulses represent incremental clockwise and counterclockwise rotation. The interface circuit includes a first switch for receiving clockwise pulses from a rotation sensor and its associated electronics, such as a fiber optic gyroscope, which pulses are indicative of changing angular position in one direction. The switch serves to apply a predetermined voltage to a summing integrator for an amount of time equal to the width of the pulses received from the rotation sensor and its associated electronics indicative of changing angular position in a specific direction. A second switch serves the same purpose as the first switch but is for receiving counterclockwise pulses from the rotation sensor and its associated electronics. This switch also applies a predetermined voltage to the summing integrator for an amount of time equal to the width of the counterclockwise pulses received from the rotation sensor and its associated electronics. A convertor receives a command signal representative of change in angular position commanded to a platform on which the position sensor and its associated electronics is mounted, and serves to convert the signal to a voltage proportional to the voltage applied by the first and second switches. The convertor also supplies the converted signal to the summing integrator. The summing integrator then receives the three voltages from the switches and converts and sums the voltages to generate an error output in volts per degrees per second when the command signal is not equal to the converted output from the rotation sensor and its associated electronics. More specifically, the error signal indicates how much the vehicle did not move versus the desired rate for a given amount of time.

In a more specific aspect, resistors are connected to the output of the two switches for generating predetermined output charges which are applied to a capacitor connected across the input and output of the summing integrator.

In a yet more specific aspect, the circuit may include a ring laser gyroscope and its associated electronics in place of the fiber optic gyroscope and its associated electronics. Since many ring laser gyroscopes have a means of providing a sinusoidal modulation about the input axis, popularly referred to as dither, to improve the sensitivity and accuracy of the gyroscope at low input rates, this dither motion appears in the clockwise and counterclockwise pulse outputs of many ring laser gyroscopes and must be removed. If this dither modulation is present in the ring laser gyroscope to be used in this invention, this invention also provides a simple means of removing this dither modulation, which consists of a resistor from a point in the normal dither control loop electronics where a buffered signal representing the dither rate motion exits to the summing point of the integrator. The polarity of this dither rate motion signal must be such that the integrator will ramp in a direction opposite that which the result of dither motion in the clockwise/counterclockwise pulses will cause the integrator to ramp, so as to cancel out the dither component of the signal in the integrator output.

Thus, in accordance with the invention there is provided a simple interface circuit which enables substitution of different types of digital rotation sensors in place of analog rotation sensors in existing systems without requiring expensive and/or extensive retro-fitting of the electronics on board existing aircraft and other guided vehicles.

BRIEF DESCRIPTION OF THE DRAWINGS

Having generally described the invention, the same will become better understood from the following detailed description, taken in conjunction with the attached drawings wherein.

DETAILED DISCUSSION OF THE INVENTION

Figure 1:
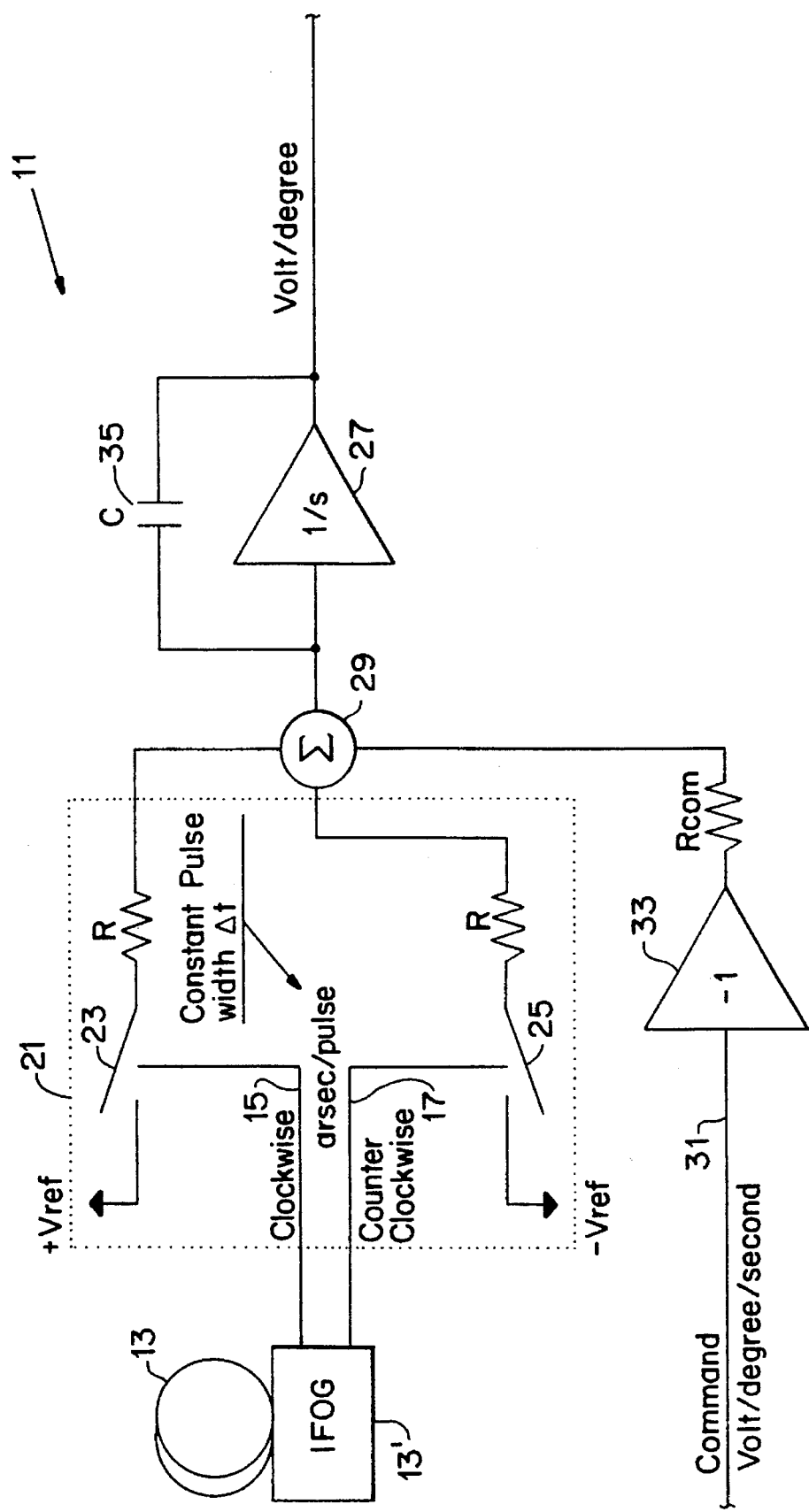
FIG. 1 is a schematic block diagram of the interface circuit in accordance with the invention shown connected to a fiber optic gyroscope.

FIG. 1 generally illustrates in schematic form an interface circuit 11 in accordance with the invention. More particularly, the interface circuit 11 is shown connected to a fiber optic gyroscope 13 and its associated electronics 13' which generates through leads 15 and 17 clockwise and/or counterclockwise pulses indicative of rotation in one direction or another to indicate a change in angular position. The pulses are passed through lines 15 and 17 to a pulse rate adjustment unit 21 which includes two switches 23 and 25 which close upon receipt of a clockwise or counterclockwise pulse respectively, to apply a voltage for a Δt time which is a function of the width of the pulses received. The voltages are applied through matching resistors R to an integrator 27. Prior to passing the voltages to the integrator 27, they are summed at summer 29 with a command signal which has been previously passed by line 31 through amplifier 33. The command signal is indicative of volts per degrees per second.

As also shown, the pulse rate adjustment unit 21 dumps a charge equal to $$\left( \frac{V_{ref}}{R} \right) \Delta t$$

for each clockwise or counterclockwise pulse into the capacitor 35 which is connected across the input and output of the integrator 27. For example, a clockwise pulse would add the above charge to capacitor 35, while a counterclockwise pulse would subtract this charge from capacitor 35. The output of amplifier 33 is a current proportional to the degrees per second commanded and also dumps a charge into capacitor 35 through resistor RCOM.

The integrator 27 sums these currents from summer 29 and generates an error in degrees when the command signal in volts per degree per second is not equal to the output pulse weight of the actual angular rate input from switches 23 and 25. Alternatively, if the command signal is equal to the output of the pulse rate adjustment unit 21, the result is a zero error signal.

Figure 2:
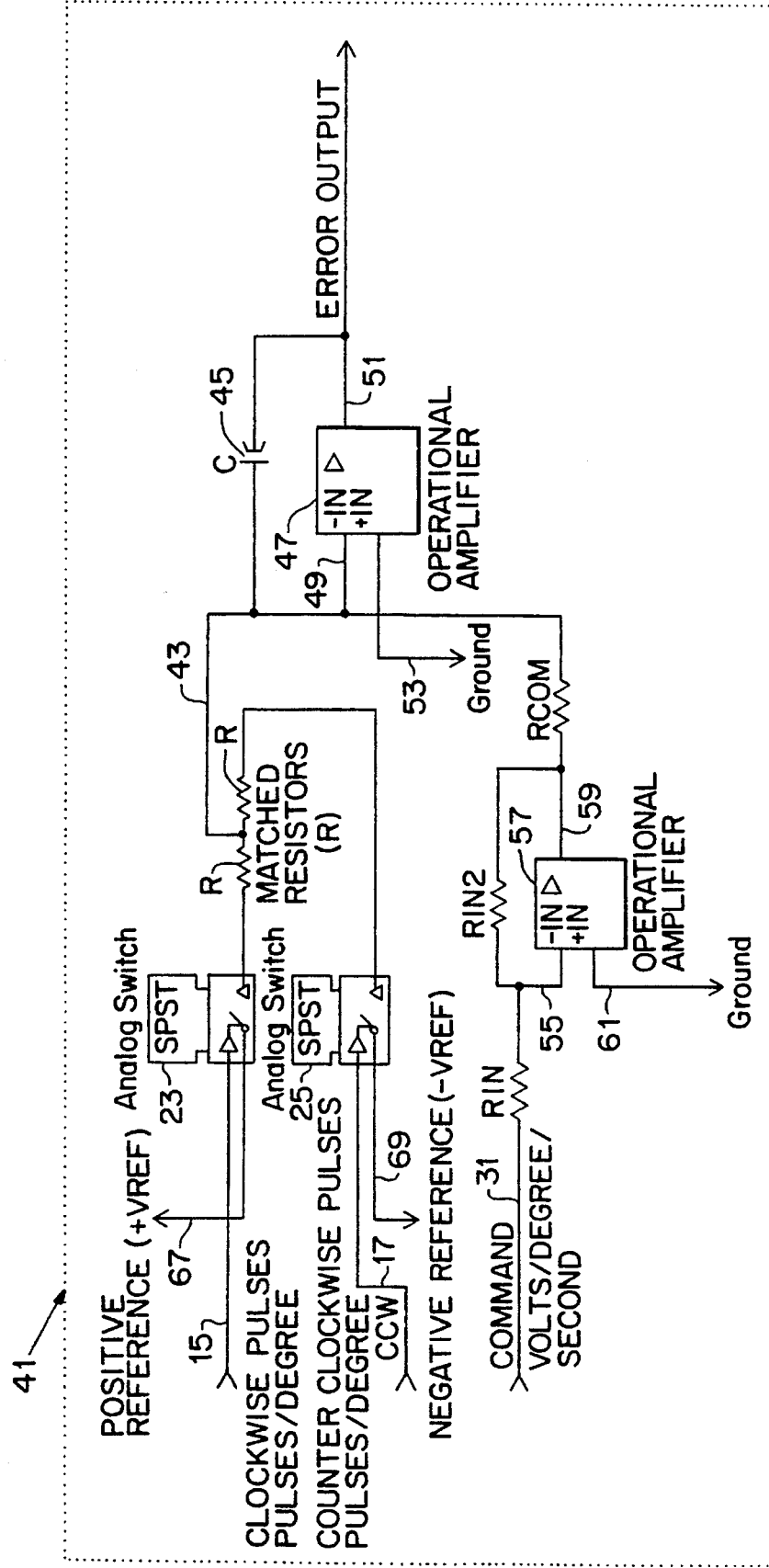
FIG. 2 is a detailed circuit diagram of the interface circuit in accordance with the invention showing the specific components thereof.

The invention is shown in greater detail as circuit 41 of FIG. 2 which is a more detailed implementation of the circuit of FIG. 1 showing specific components employed therein. In FIG. 2 the clockwise and counterclockwise pulses are transmitted through lines 15 and 17 to analog switches 23 and 25 which are part of the pulse rate adjustment unit 21 of FIG. 1, are shown in greater detail in FIG. 2 and are respectively connected to positive and negative references 67 and 69. Upon a pulse being received, the respective switch 23 or 25 is closed for a time Δt corresponding to the width of each pulse. The switches 23 and 25 provide an output which is a known voltage, positive for clockwise and negative for counterclockwise, through a matched set of resistors R through line 43 to a summing integrator consisting of a capacitor 45 and an operational amplifier 47, with the capacitor connected across an input 49 and output 51 of amplifier 47. The operational amplifier 47 is connected to ground through line 53 and otherwise connected within the circuit 41 in a conventional manner. The voltage out of each switch 23 and 25 is divided by a resistance provided by matched resistors R at the output thereof to provide a charge to capacitor 45, as noted previously, equal to $$\left( \frac{V_{ref}}{R} \right) \Delta t$$

This average of the charge provided to the operational amplifier 47 by the pulses from the fiber optic gyroscope 13 is a current which is proportional to the degrees per second that the sensor is experiencing as a result of movement.

On the bottom half of the circuit 41, there is provided a command signal in volts per degrees per second through line 31 through resistor RIN and lead 55 to an operational amplifier 57 having another resistor RIN2 connected across the input line 55 and an output line 59. The operational amplifier 57 is also connected to ground through line 61 in a conventional manner and passes through resistor RCOM a negative current equal to $$-\left( \frac{V_{com}}{R_{com}} \right)\left( \frac{RIN2}{RIN} \right)$$

which is proportional to the degrees per second commanded. The operational amplifier 47 then sums all the currents to create an error output signal in volts per degree when the command signal in volts per degrees per second is not equal to the output pulse weight of the actual angular rate.

The resistances at the output of the switches 23 and 25 and at the output of operational amplifier 57 at RCOM are selected in a manner well known to those of ordinary skill in the art to provide proper scaling of the command to the pulse weight, and to allow for closed loop control. Thus, in accordance with the invention, it is possible to employ an inertial sensor with a pulse output such as a fiber optic gyroscope to emulate a spinning mass gyroscope within presently existing spinning mass gyroscope guidance systems.

Figure 3:
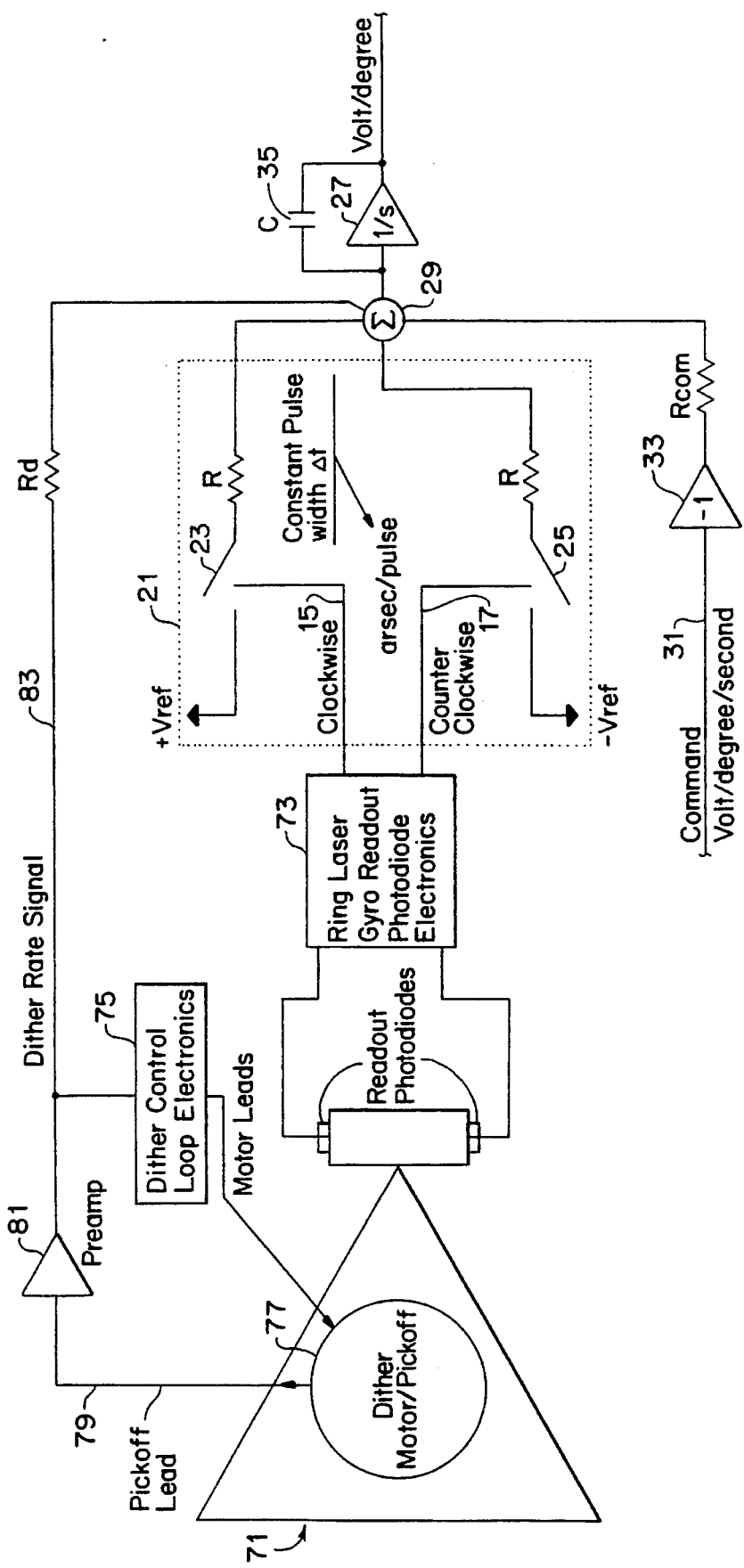
FIG. 3 is a block diagram showing a specific circuit adaptation for the interface circuit of the invention for use with a ring laser gyroscope.

In another variation of this invention, a ring laser gyroscope 71 and its associated electronics 73 may be substituted in place of the fiber optic gyroscope and its associated electronics. If the ring laser gyroscope does not have any dither modulation components in its clockwise and counterclockwise pulse outputs, then the block diagram for the ring laser gyroscope variation of this invention is identical to FIG. 1, except that the fiber optic gyroscope 13 and its associated electronics 13 would be replaced with the ring laser gyroscope 71 and its associated electronics 73. If dither modulation is present in the ring laser gyroscope to be used in this invention, then the block diagram in FIG. 3 better represents the invention. The difference between FIG. 3 and FIG. 1 is that FIG. 3 also includes a simple means of removing this dither modulation, which consists of a resistor Rd from a point in the normal dither control loop electronics 75 where a buffered signal representing the dither rate motion exists from dither motor/pickoff 77 through pickoff lead 79 through a preamplifier 81 and lead 83 and through resistor Rd to the summer 29 of the integrator 27. The polarity of this dither rate motion signal must be such that the integrator 27 will ramp in a direction opposite that which the result of dither motion in the clockwise/counterclockwise pulses will cause the integrator 27 to ramp, so as to cancel out the dither component of the signal in the integrator output. The value of this resistor Rd is chosen such that, if dither modulation is the only motion present about the input axis of the gyroscope, then, for a given amount of dither motion, the change in the output of the integrator due to the signal through the resistor Rd is equal and opposite to the change in the integrator output due to clockwise and counterclockwise pulse outputs.

Having generally described the invention, the same will become better understood from the appended claims wherein the invention is set forth in a non-limiting manner.

What is claimed is:

1. An interface circuit for connecting a digital pulse output rotation sensor and its associated electronics to a spinning mass rotation measurement system, the interface circuit comprising:

a first switch for receiving clockwise pulses from a digital pulse output rotation sensor and its associated electronics indicative of a change in angular position, the clockwise pulses actuating the first switch to permit a first voltage to pass through the first switch for an amount of time equal to the width of the clockwise pulses received from a digital pulse output rotation sensor and its associated electronics;

a second switch for receiving counterclockwise pulses from a digital pulse output rotation sensor and its associated electronics indicative of a change in angular position, the counterclockwise pulses actuating the second switch to permit a second voltage to pass through the second switch for an amount of time equal to the width of the counterclockwise pulses received from a digital pulse output rotation sensor and its associated electronics;

a convertor for receiving a command signal representative of change in angular rate commanded to a platform on which a digital pulse output rotation sensor and its associated electronics is mounted, the convertor converting the command signal to a third voltage proportional to the first and second voltages passing through the first and second switches, respectively; and a summing integrator for receiving the first and second voltages from the first and second switches, respectively, and the third voltage from the convertor, the summing integrator summing the first, second and third voltages applied thereto for generating an error output in volts per degrees per second when the third voltage is not equal to a sum of the first and second voltages.

2. An interface circuit as in claim 1 further comprising:

first resistor means connected to an output of the first switch for generating a first output charge to be applied across the summing integrator;

second resistor means connected to an output of the second switch for generating a second output charge to be applied across the summing integrator; and third resistor means connected to an output of the convertor for generating a third output charge to be applied across the summing integrator.

3. An interface circuit as in claim 2 further comprising a capacitor connected across an input and an output of the summing integrator for having the first, second and third output charges applied thereto.

4. An interface circuit as in claim 3 wherein the summing integrator is an operational amplifier.

5. An interface circuit as in claim 3 wherein the convertor is an operational amplifier connected to operate as an inverting buffer for the command signal.

6. An interface circuit as in claim 3 wherein the first and second switches receive clockwise and counterclockwise pulses, respectively, from a fiber optic based digital pulse output rotation sensor.

7. An interface circuit as in claim 3 wherein the first and second switches receive clockwise and counterclockwise pulses, respectively, from a ring laser based digital pulse output rotation sensor.

8. An interface circuit as in claim 7, and further comprising a resistor connected to dither control loop electronics of a ring laser based digital pulse output rotation sensor and to the summing integrator at a point where a signal representing a dither rate motion of a ring laser based rotation sensor is present with a polarity such that, when it is applied to the summing integrator, dither modulation received by the summing integrator from the first and second switches is canceled.

* * * * *